(12) United States Patent
Kuo

(10) Patent No.: US 10,190,614 B2
(45) Date of Patent: Jan. 29, 2019

(54) FIXING DEVICE

(71) Applicant: Jerry Kuo-Yung Kuo, Taichung (TW)

(72) Inventor: Jerry Kuo-Yung Kuo, Taichung (TW)

( * ) Notice: Subject to any disclaimer, the term of this patent is extended or adjusted under 35 U.S.C. 154(b) by 0 days.

(21) Appl. No.: 15/708,751

(22) Filed: Sep. 19, 2017

(65) Prior Publication Data

US 2018/0340562 A1  Nov. 29, 2018

(30) Foreign Application Priority Data

May 23, 2017 (TW) .............................. 106207329 U

(51) Int. Cl.
*F16M 13/00* (2006.01)
*F16B 17/00* (2006.01)
*F16M 13/02* (2006.01)
*F16B 2/22* (2006.01)

(52) U.S. Cl.
CPC ............... *F16B 17/00* (2013.01); *F16B 2/22* (2013.01); *F16M 13/02* (2013.01)

(58) Field of Classification Search
CPC . A47G 25/0692; A47K 10/04; A47K 2201/02
USPC ............. 248/231.91, 214, 227.4, 201, 200.1, 248/220.1; 211/123
See application file for complete search history.

(56) References Cited

U.S. PATENT DOCUMENTS

| | | | | |
|---|---|---|---|---|
| 2,715,468 A * | 8/1955 | Waltz | ..................... | A47K 10/10 211/105.6 |
| 5,875,903 A * | 3/1999 | Chen | ..................... | A47K 10/10 211/105.1 |
| 8,671,545 B1 * | 3/2014 | Zimmerman | .......... | F16M 13/02 211/123 |
| 9,271,615 B1 * | 3/2016 | Stephens | ................ | A47K 10/10 |
| 2009/0242713 A1 * | 10/2009 | Lowe | ..................... | A47K 10/10 248/222.13 |
| 2012/0145854 A1 * | 6/2012 | Smith | ..................... | A47K 10/10 248/226.11 |
| 2017/0336020 A1 * | 11/2017 | Jones | ..................... | F16M 13/02 |

FOREIGN PATENT DOCUMENTS

DE  29909663 U1  8/1999

OTHER PUBLICATIONS

Search Report issued to European counterpart application No. 17194361.6 by the EPO dated Oct. 18, 2018.

* cited by examiner

*Primary Examiner* — Steven M Marsh
(74) *Attorney, Agent, or Firm* — Trop, Pruner & Hu, P.C.

(57) ABSTRACT

A fixing device includes a fixing member adapted to be mounted on a wall, a hollow shell body made of metal and being formed with a through groove, and plastic first and second connecting members. The through groove has a first groove portion extending in a first direction, and a second groove portion extending in a second direction that is substantially perpendicular to the first direction. The first connecting member is securely connected to the fixing member, and has a linking portion inserted into the first groove portion. The second connecting member has a connecting portion inserted into the second groove portion and connected to the linking portion, and is adapted for connection with an object holder.

7 Claims, 8 Drawing Sheets

FIXING DEVICE

CROSS-REFERENCE TO RELATED APPLICATION

This application claims priority of Taiwanese Patent Application No. 106207329, filed on May 23, 2017.

FIELD

The disclosure relates to a fixing device, and more particularly to a fixing device suitable for use in a bathroom for supporting an object holder.

BACKGROUND

Referring to FIG. 1, Taiwanese Patent No. 409555 discloses a conventional object holder assembly 1. The conventional object holder assembly 1 includes two base seats 11 and an object holder 12. Each of the base seats 11 includes a plate portion 111 adapted to be mounted on a wall (not shown), and a connecting portion 112 connected to the plate portion 111. The connecting portion 112 of each of the base seats 11 is substantially L-shaped and has a linking block 113. The object holder 12 is a metallic tube and has opposite end portions. The linking block 113 of each of the base seats 11 engages a respective one of the end portions of the object holder 12. However, the base seats 11 are generally formed via a casting process, thereby causing the conventional object holder to be relatively heavy.

SUMMARY

Therefore, an object of the disclosure is to provide a fixing device that can alleviate the drawback associated with the abovementioned prior art.

Accordingly, the fixing device is adapted to be mounted on a wall for connection with an object holder. The fixing device includes a fixing member, a hollow shell body, a first connecting member, and a second connecting member. The fixing member is adapted to be mounted on the wall. The shell body is made of metal, has first and second end surfaces, and is formed with a through groove. The through groove has a first groove portion extending through the first end surface in a first direction, and a second groove portion extending through the second end surface in a second direction which is substantially perpendicular to the first direction. The first connecting member is made of a plastic material, is securely connected to the fixing member, and has a linking portion that extends in the first direction and that is inserted into the first groove portion of the through groove. The second connecting member is made of a plastic material, is adapted to be connected to the object holder, and has a connecting portion that extends in the second direction, that is inserted into the second groove portion of the through groove, and that is securely connected to the linking portion of the first connecting member.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
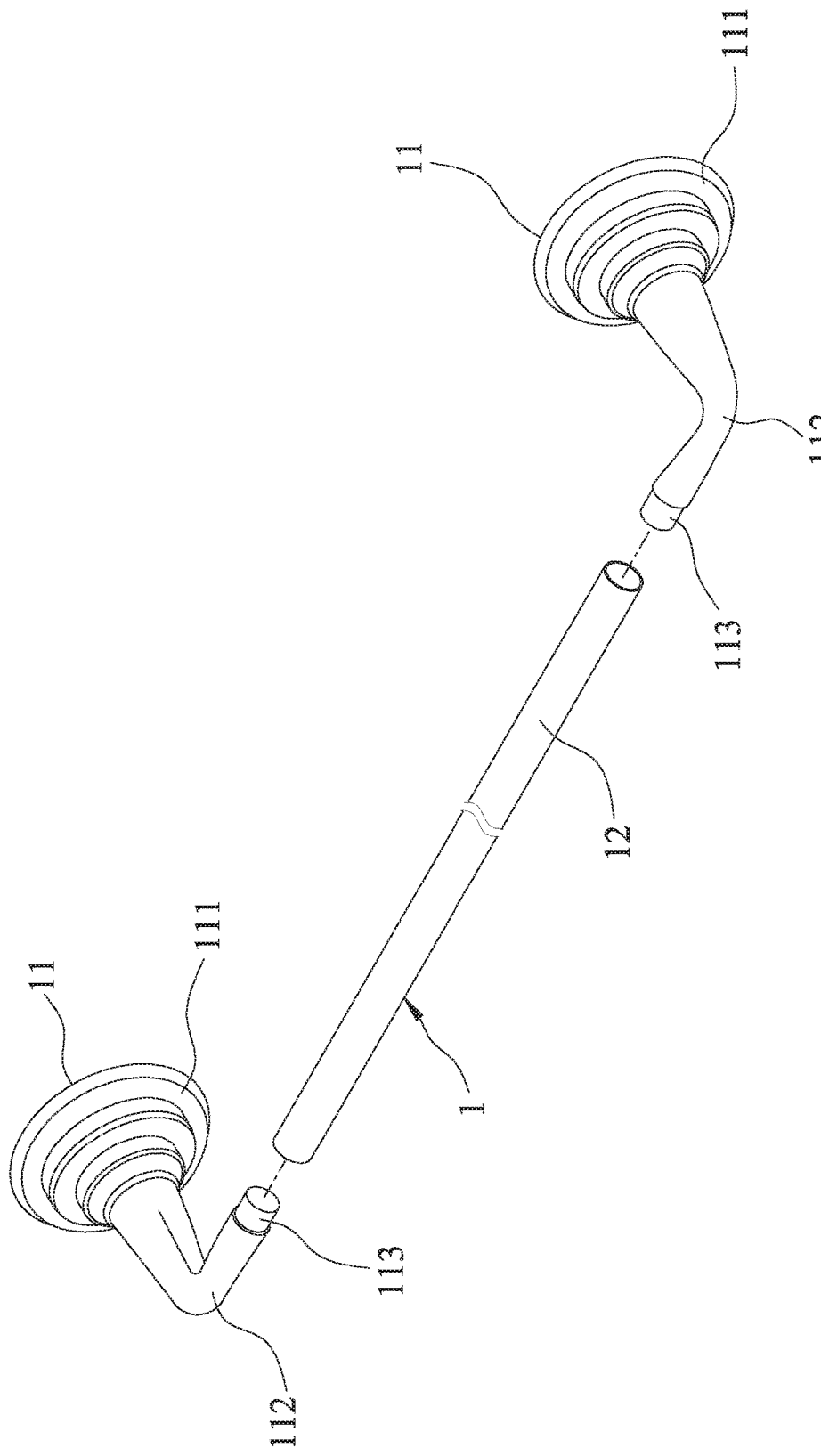
FIG. 1 is a fragmentary exploded perspective view of a conventional object holder assembly.

Before the present invention is described in greater detail, it should be noted that where considered appropriate, reference numerals or terminal portions of reference numerals have been repeated among the figures to indicate corresponding or analogous elements, which may optionally have similar characteristics.

Figure 2:
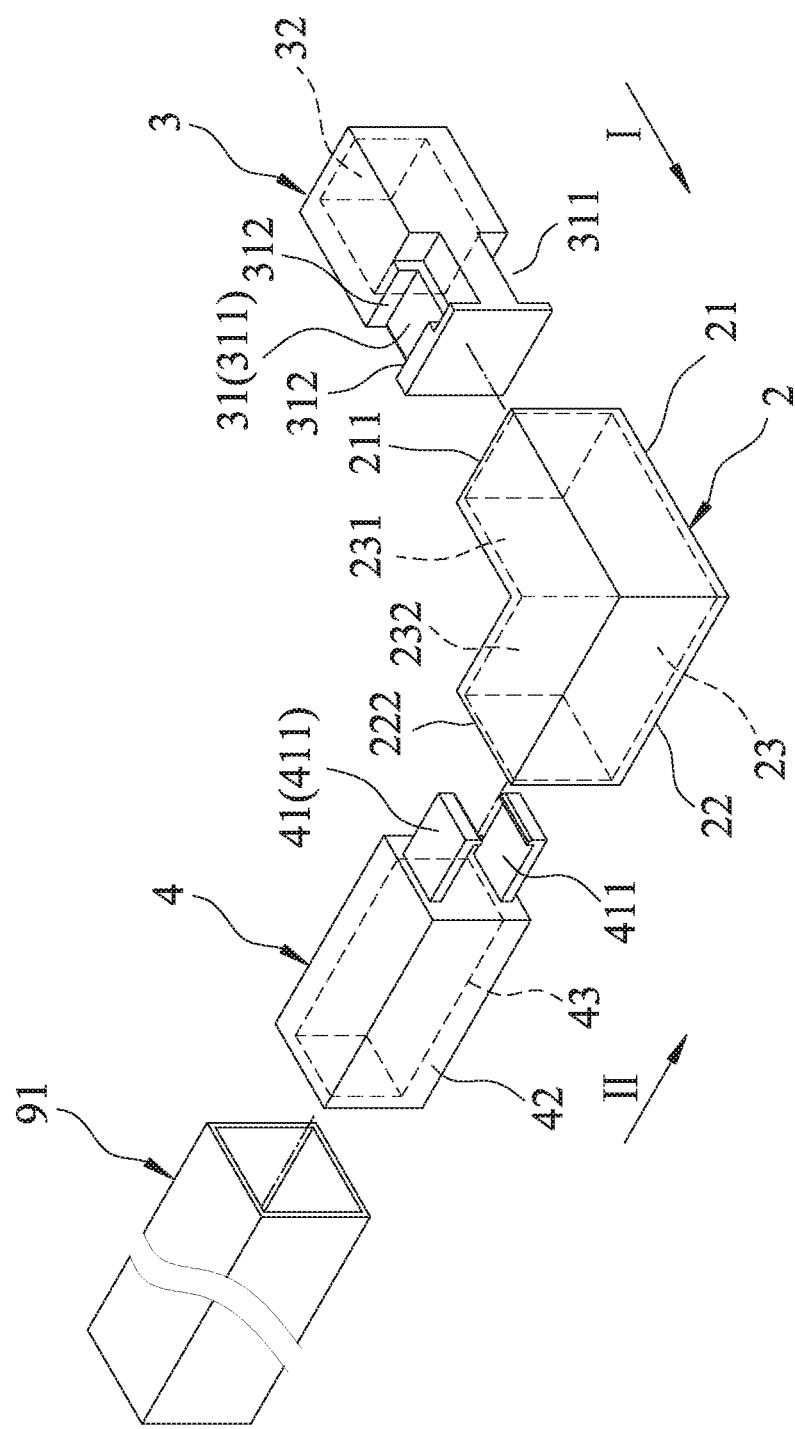
FIG. 2 is a fragmentary exploded perspective view of a first embodiment of a fixing device according to the present disclosure.
Figure 3:
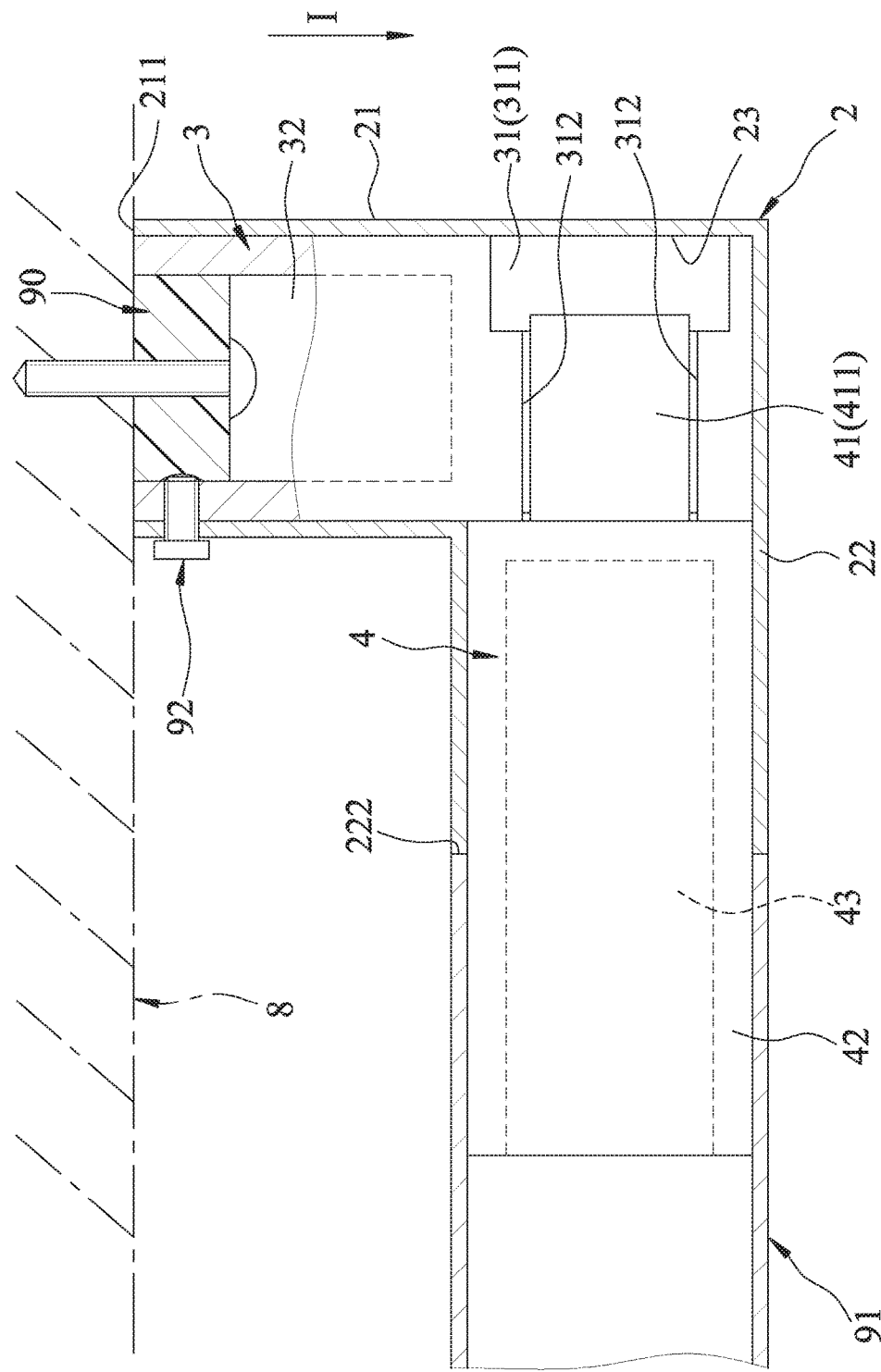
FIG. 3 is a sectional view of the first embodiment being mounted on a wall and connected to an object holder.

Referring to FIGS. 2 and 3, a first embodiment of a fixing device according to the disclosure is suitable for use in a bathroom and is adapted to be mounted on a wall 8 for connection with an object holder 91. The object holder 91 is a square tube in this embodiment, but may have other configurations in other embodiments.

The fixing device includes a fixing member 90, a hollow shell body 2, a first connecting member 3, and a second connecting member 4.

The fixing member 90 is adapted to be fixedly mounted on the wall 8. In this embodiment, the fixing member 90 is made of a plastic material and has a rectangular shape, but the material and the configuration of the fixing member 90 may vary in other embodiments.

The shell body 2 is made of metal and is substantially L-shaped. The shell body 2 includes a surrounding wall. The surrounding wall has a first end portion 21 extending in a first direction (I) and having a first end surface 211, and a second end portion 22 extending in a second direction (II) that is substantially perpendicular to the first direction (I) and having a second end surface 222. The first end surface 211 and the second end surface 222 serve respectively as two end surfaces of the shell body 2. The surrounding wall of the shell body 2 is formed with a through groove 23 (i.e., the surrounding wall surrounds the through groove 23) having a first groove portion 231 that extends through the first end surface 211 in the first direction (I), and a second groove portion 232 that extends through the second end surface 222 in the second direction (II).

In this embodiment, the shell body 2 is formed via cutting, bending and welding a piece of sheet metal, but the manufacturing process of the shell body 2 may vary in other embodiments. Since the manufacturing process of the shell body 2 is known in the art, further details on the same are omitted herein for the sake of brevity. The surrounding wall of the shell body 2 has a thickness that is smaller than 2 millimeters. In this embodiment, the thickness of the surrounding wall ranges from 1 millimeter to 1.2 millimeters.

While in this embodiment, the first direction (I) and the second direction (II) are exemplified to be substantially perpendicular to each other, the angle between the first and second directions (I, II) may ranges from 85 degrees to 95 degrees, preferably from 88 degrees to 92 degrees in other embodiments.

The first connecting member 3 is made of a plastic material, and has a linking portion 31 that extends in the first direction (I), and an end surface that is opposite to the linking portion 31 in the first direction (I). The first connecting member 3 further has a receiving groove 32 being formed in the end surface of the first connecting member 3. In this embodiment, the linking portion 31 has two engaging grooves 311. Each of the engaging grooves 311 is defined between two limiting surfaces 312 which are spaced apart from each other in the first direction (I).

The linking portion 31 is inserted into the first groove portion 231 of the through groove 23 of the shell body 2. The receiving groove 32 is securely engaged with the fixing member 90, and has a shape in accordance with that of the fixing member 90.

In this embodiment, the end surface of the first connecting member 3 is flush with the first end surface 211 of the first portion 21 of the shell body 2. It should be noted that, in other embodiments, the length of the first connecting member 3 may be shorter such that the end surface of the first connecting member 3 is retracted within the first groove portion 231 of the through groove 23.

The second connecting member 4 is made of a plastic material, and has a connecting portion 41 that extends in the second direction (II), and a coupling portion 42 that is opposite to the connecting portion 41 in the second direction (II). In this embodiment, the connecting portion 41 is inserted into the second groove portion 232 of the through groove 23 of the shell body 2 and is securely connected to the linking portion 31 of the first connecting member 3. The connecting portion 41 has two hooks 411. Each of the hooks 411 engages a respective one of the engaging grooves 311 of the linking portion 31, and is positioned between the two limiting surfaces 312 by which the respective one of the engaging grooves 311 is defined, thus the movement of the hooks 411 in the first direction (I) is limited. In this embodiment, the coupling portion 42 is disposed outside of the second end surface 222 of the shell body 2 and is adapted for connection with the object holder 91. The coupling portion 42 is formed with an internal groove 43 for reducing the weight of the second connecting member 4.

When assembling the fixing device of this embodiment, a user first needs to mount the fixing member 90 on the wall 8, engage the fixing member 90 with the receiving groove 32 of the first connecting member 3, and then couple the shell body 2 to the first connecting member 3 with the linking portion 31 of the first connecting member 3 being inserted into the first groove portion 231 of the through groove 23 of the shell body 2. Then, the user inserts the second connecting member 4 into the second groove portion 232 of the through groove 23 with the hooks 411 respectively engaging the engaging grooves 311. Afterwards, a screw 92 (see FIG. 3) is applied to extend from the first end portion 21 of the shell body 2 through the first connecting member 3 into the fixing member 90, so as to threadedly secure the shell body 2 and the first connecting member 3 onto the fixing member 90. The object holder 91 is held to securely engage the coupling portion 42 of the second connecting member 4 with another screw (not shown), thereby completing the installation of the fixing device.

It should be noted that the abovementioned assembling process of the fixing device of this embodiment according to the present disclosure may vary in other embodiments. For example, the user may assemble the shell body 2 and the first and second connecting members 3, 4 together before coupling the first connecting member 3 to the fixing member 90 and coupling the second connecting member 4 to the object holder 91.

Figure 4:
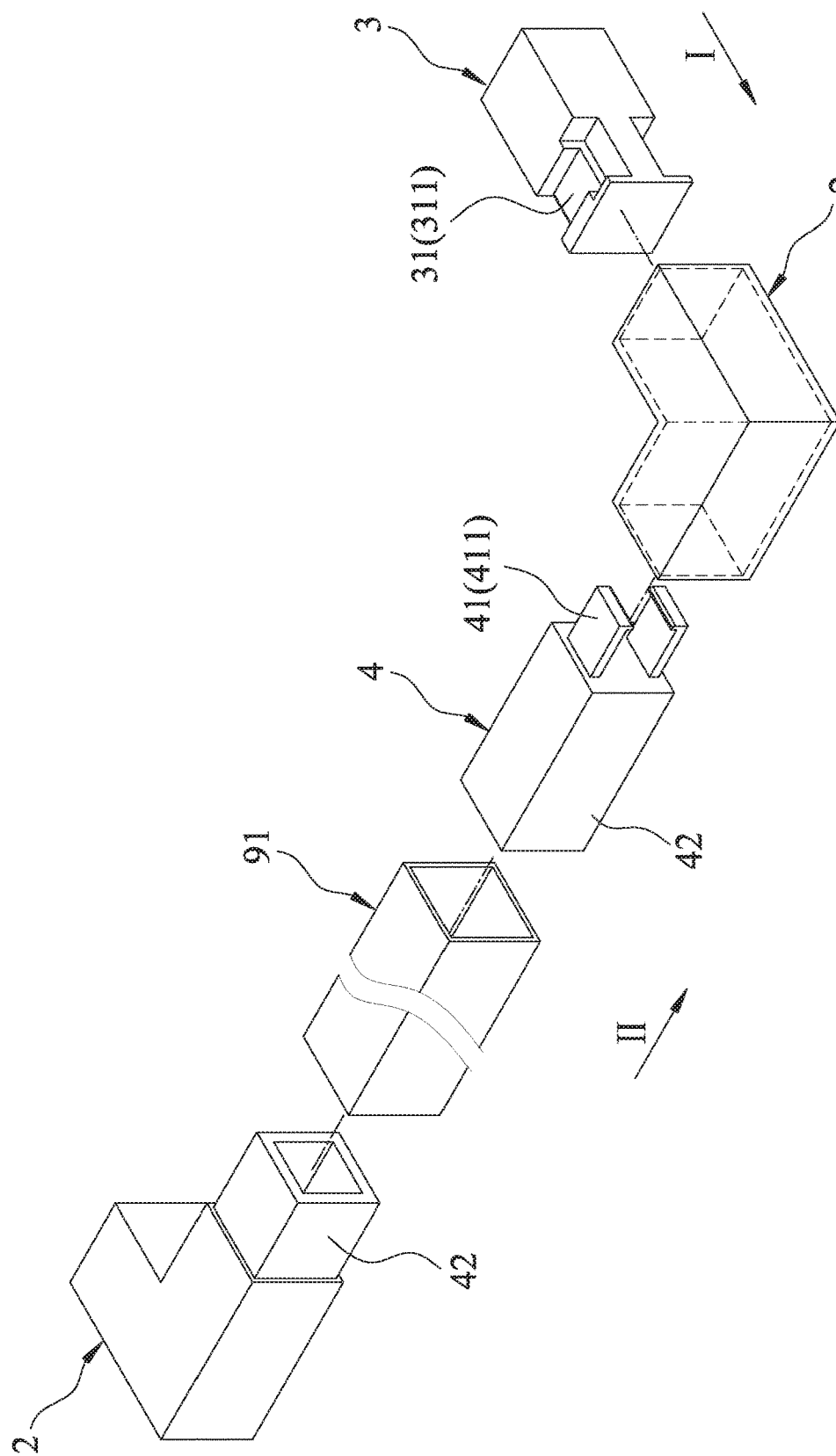
FIG. 4 is a fragmentary and partly exploded perspective view, illustrating two first embodiments that are at opposite sides of the object holder.

Referring to FIG. 4, the object holder 91 may be secured with opposite ends thereof being connected respectively to two of the fixing devices of the first embodiment according to the present disclosure to meet the user's requirement.

With the above description, the advantage of the fixing device according to the present disclosure can be summarized in the following:

1. By virtue of the configuration that the shell body 2 is hollow and the first and second connecting members 3, 4 are made of plastic materials, the weight of the fixing device can be reduced.

2. Since the shell body 2 is manufactured from the sheet metal, the outer surface of the shell body 2 would be smooth, finished and lustrous, thus a surface treatment for the shell body 2 would not be required.

Figure 5:
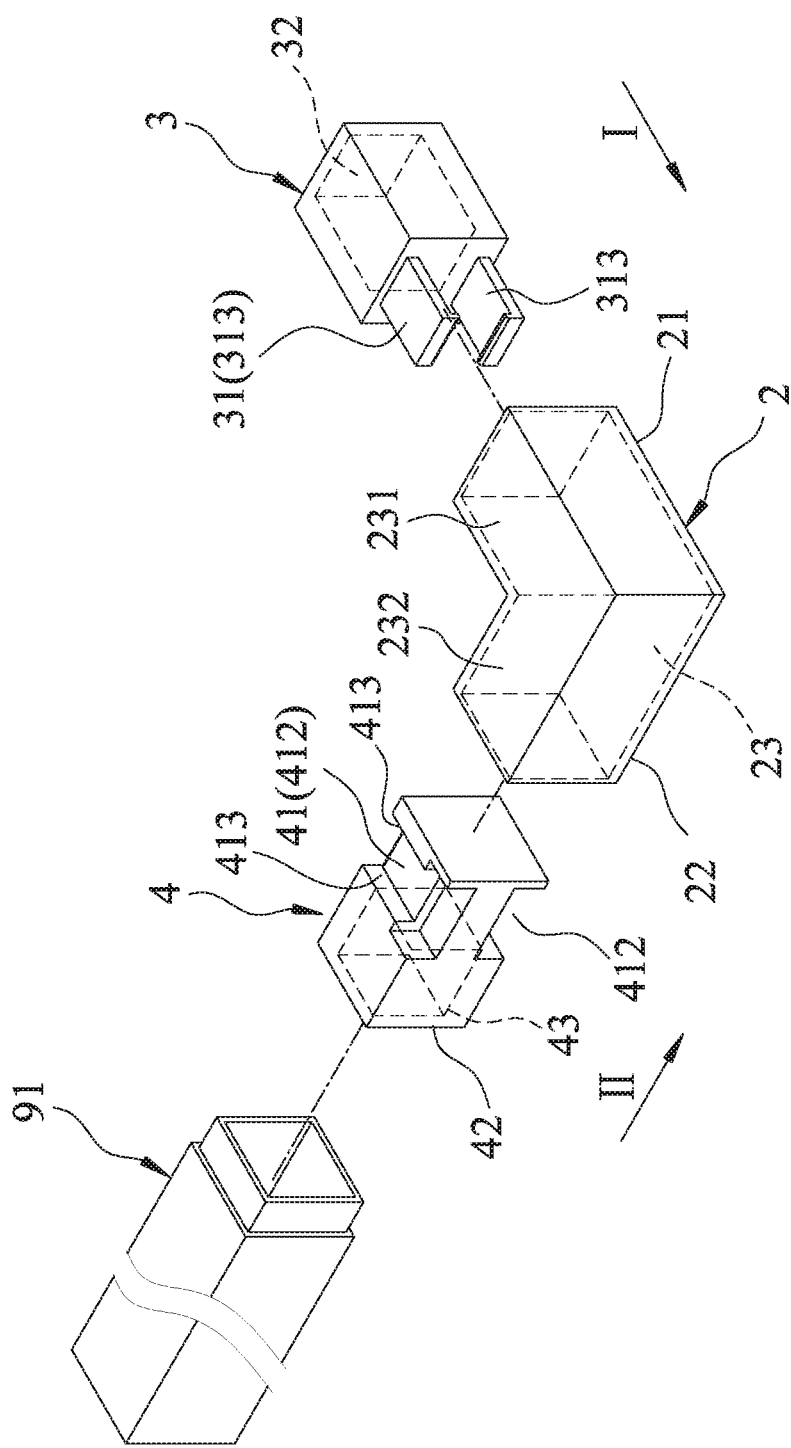
FIG. 5 is a fragmentary exploded perspective view of a second embodiment of a fixing device according to the present disclosure.
Figure 6:
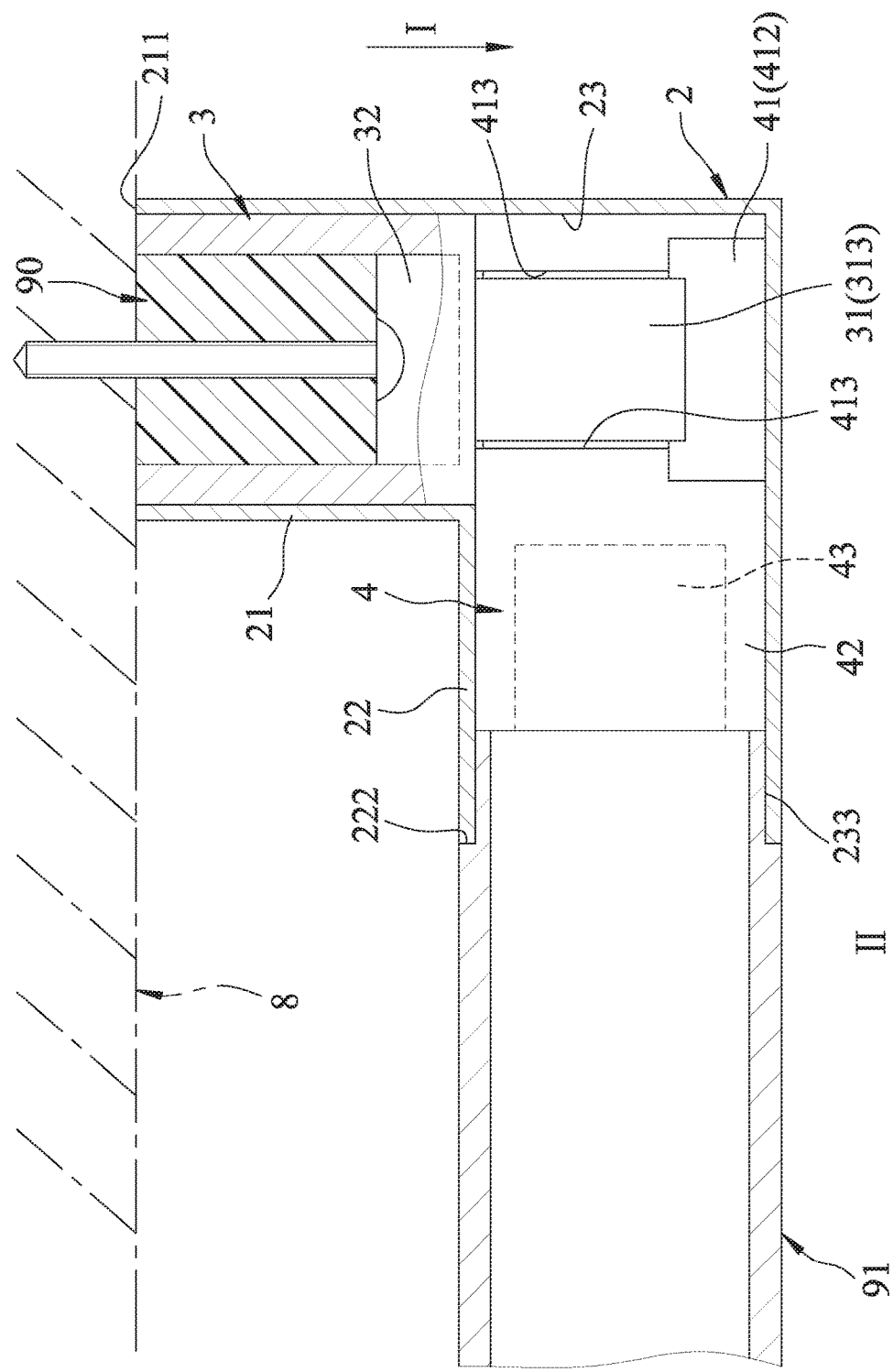
FIG. 6 is a sectional view of the second embodiment being mounted on the wall and connected to the object holder.

Referring to FIGS. 5 and 6, a second embodiment of the fixing device has a structure similar to that of the previous embodiment. The main difference between the second embodiment and the first embodiment resides in that the configurations of the linking portion 31 of the first connecting member 3 and the connecting portion 41 of the second connecting member 4 are interchanged.

In this embodiment, the linking portion 31 of the first connecting member 3 has two hooks 313. The connecting portion 41 of the second connecting member 4 has two engaging grooves 412. Each of the engaging grooves 412 is defined between two limiting surfaces 413 which are spaced apart from each other in the second direction (II). The hooks 313 are inserted into the first groove portion 231 of the through groove 23 of the shell body 2, and engage securely and respectively the engaging grooves 412. Each of the hooks 313 is positioned between the two limiting surfaces 413 by which the respective one of the engaging grooves 412 is defined, such that the movement of the first connecting member 3 in the second direction (II) is limited.

The coupling portion 42 of the second connecting member 4 is disposed in the second groove portion 232 of the through groove 23 of the shell body 2. The second groove portion 232 of the through groove 23 has an end groove section 233 that is adjacent to the second end surface 222 of the second portion 22 of the shell body 2, and that is adapted for engagement with the object holder 91. The second embodiment has the same advantage as those of the first embodiment.

Since the assembling process of this embodiment is similar to the first embodiment and is previously described, further details of the same are omitted herein for the sake of brevity.

Figure 7:
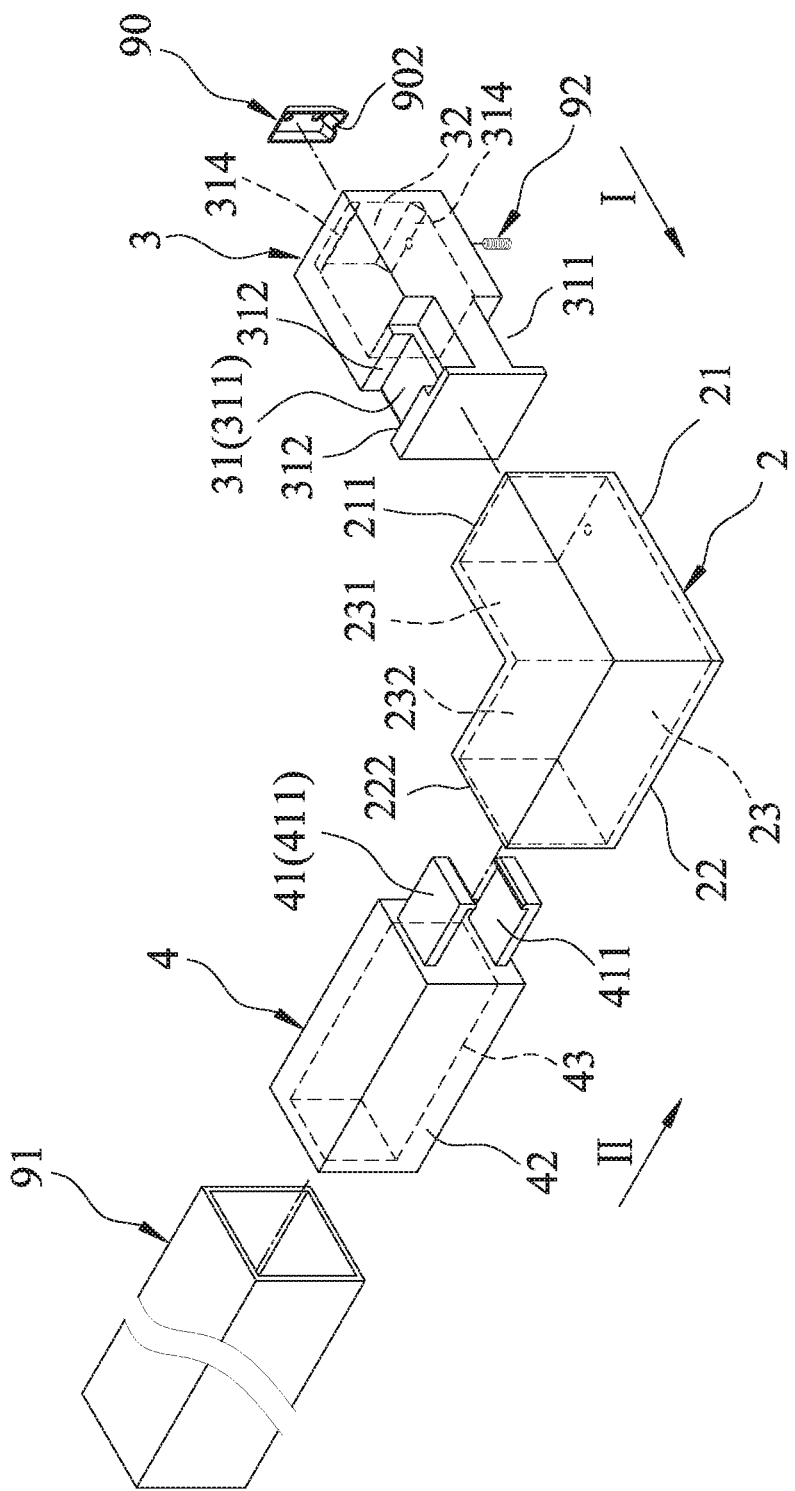
FIG. 7 is an exploded perspective view of a third embodiment of a fixing device according to the present disclosure.
Figure 8:
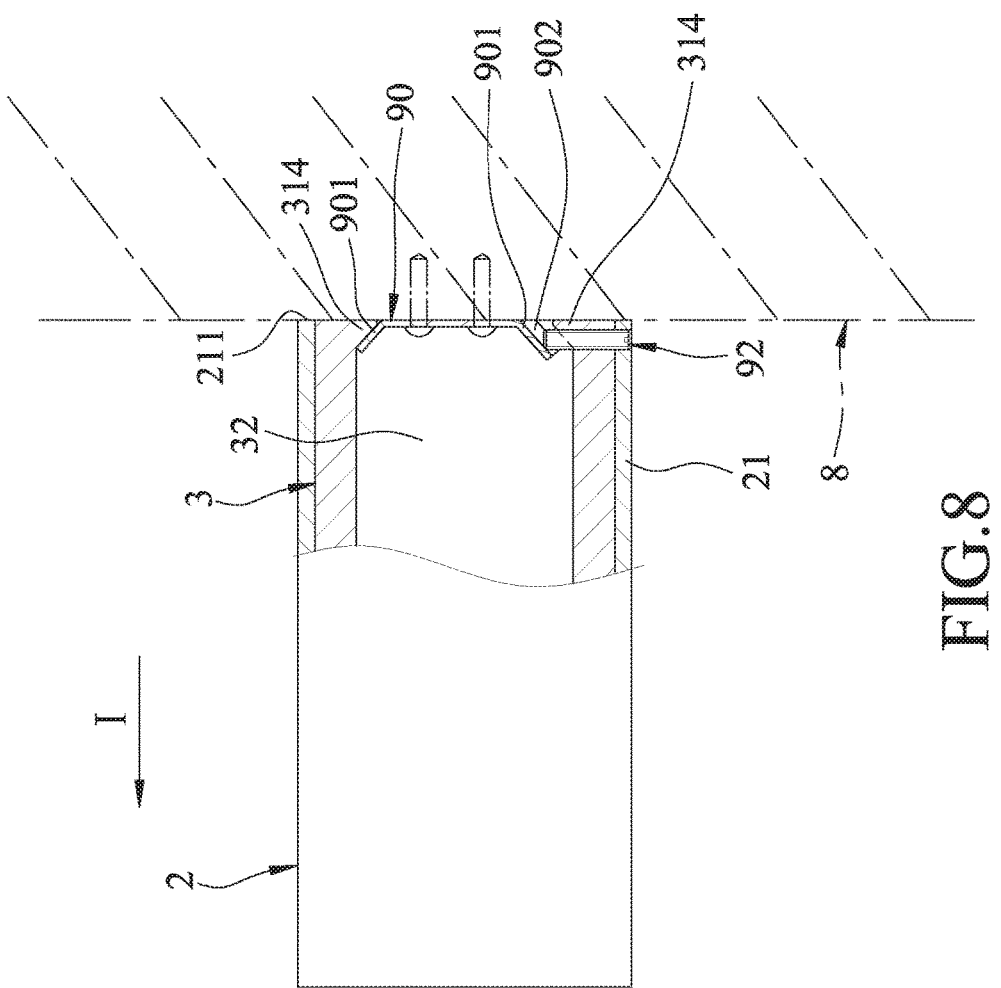
FIG. 8 is a partly sectional view of the third embodiment being mounted on the wall.

Referring to FIGS. 7 and 8, a third embodiment of the fixing device has a structure similar to that of the first embodiment. The main difference between the third embodiment and the first embodiment resides in that the fixing member 90 is made of metal and has a shape of a rectangular frustum. The fixing member 90 has two peripheral segments 901 that are opposite to each other in a direction perpendicular to the first and second directions (I, II), and that are inclined relative to the wall 8. One of the peripheral segments 901 is formed with a groove 902.

The first connecting member 3 further has two stop portions 314 opposite to each other, projecting into the receiving groove 32, and being proximate to the first end surface 211 of the first portion 21 of the shell body 2.

When the fixing device of the present disclosure is assembled, each of the stop portions 314 of the first connecting member 3 is retained between the wall 8 and a respective one of the peripheral segments 901 of the fixing member 90. The screw 92 extends through the first end portion 21 of the shell body 2 and a corresponding one of the stop portions 314 into the groove 902, so as to secure the shell body 2 and the first connecting member 3 onto the fixing member 90. The third embodiment has the same advantage as those of the first embodiment. It should be noted that, in other embodiments, the first connecting member 3 may has only one stop portion 314 retained between the wall 8 and one of the peripheral segments 901.

In the description above, for the purposes of explanation, numerous specific details have been set forth in order to provide a thorough understanding of the embodiment. It will be apparent, however, t one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A fixing device adapted to be mounted on a wall for connection with an object holder, said fixing device comprising:
   a fixing member adapted to be mounted on the wall;
   a hollow shell body made of metal, having first and second end surfaces, and being formed with a through groove that has a first groove portion extending through said first end surface in a first direction, and a second groove portion extending through said second end surface in a second direction which is substantially perpendicular to the first direction;
   a first connecting member made of a plastic material, securely connected to said fixing member, and having a linking portion that extends in the first direction, and that is inserted into said first groove portion of said through groove;
   a second connecting member made of a plastic material, adapted to be connected to the object holder, and having a connecting portion that extends in the second direction, that is inserted into said second groove portion of said through groove, and that is securely connected to said linking portion of said first connecting member;
   wherein said linking portion of said first connecting member has two engaging grooves; and
   wherein said connecting portion of said second connecting member has two hooks engaging respectively said engaging grooves.

2. The fixing device as claimed in claim 1, wherein said shell body includes a surrounding wall surrounding said through groove, and having a thickness that is smaller than 2 millimeters.

3. The fixing device as claimed in claim 1, wherein said first connecting member further has a receiving groove that is formed in an end surface thereof opposite to said linking portion in the first direction, and that is securely engaged with said fixing member.

4. The fixing device as claimed in claim 3, wherein:
   said fixing member has at least one peripheral segment adapted to be inclined relative to the wall; and
   said first connecting member further has at least one stop portion projecting into said receiving groove, being proximate to said first and surface of said shell body, and adapted to be retained between the wall and said at least one peripheral segment of said fixing member.

5. The fixing device as claimed in claim 1, wherein said second connecting member further has a coupling portion being opposite to said connecting portion, disposed outside of said shell body, and adapted for connection with the object holder.

6. The fixing device as claimed in claim 1, wherein:
   said second connecting member further has a coupling portion being opposite to said connecting portion, and disposed in said second groove portion of said through groove of said shell body; and
   said second groove portion of said through groove of said shell body has an end groove section adjacent to said second end surface and adapted for engagement with the object holder.

7. The fixing device as claimed in claim 1, wherein:
   said connecting portion of said second connecting member has two engaging grooves; and
   said linking portion of said first connecting member has two hooks engaging respectively said engaging grooves.

* * * * *